(12) United States Patent
Rosenbrock et al.

(10) Patent No.: US 9,132,755 B2
(45) Date of Patent: Sep. 15, 2015

(54) STRUCTURE AND METHOD FOR PIVOTABLY SUPPORTING AN ARMREST ON A SEAT

(75) Inventors: Marc Adam Rosenbrock, Royal Oak, MI (US); Karl Schafer, Holly, MI (US)

(73) Assignee: Lear Corporation, Southfield, MI (US)

( * ) Notice: Subject to any disclaimer, the term of this patent is extended or adjusted under 35 U.S.C. 154(b) by 648 days.

(21) Appl. No.: 13/422,327

(22) Filed: Mar. 16, 2012

(65) Prior Publication Data

US 2012/0235461 A1 Sep. 20, 2012

Related U.S. Application Data

(60) Provisional application No. 61/453,721, filed on Mar. 17, 2011.

(51) Int. Cl.
*A47C 7/54* (2006.01)
*B60N 2/46* (2006.01)
*B60N 2/18* (2006.01)
*B60N 2/50* (2006.01)

(52) U.S. Cl.
CPC ............. *B60N 2/4606* (2013.01); *B60N 2/1842* (2013.01); *B60N 2/4633* (2013.01); *B60N 2/504* (2013.01)

(58) Field of Classification Search
CPC .... B60N 2/1842; B60N 2/504; B60N 2/4633; B60N 2/4606

USPC ............... 297/411.38, 411.32, 411.3, 411.35, 297/115, 411.31, 116, 411.36, 411.37
See application file for complete search history.

(56) References Cited

U.S. PATENT DOCUMENTS

| | | | |
|---|---|---|---|
| 5,409,297 A | 4/1995 | De Filippo | |
| 5,934,756 A | 8/1999 | Smith | |
| 6,916,068 B2* | 7/2005 | Kitamura et al. | 297/411.3 |
| 7,198,331 B2* | 4/2007 | Omori | 297/411.32 |
| 7,393,058 B2* | 7/2008 | Omori | 297/411.32 |
| 7,484,810 B2 | 2/2009 | Yamane et al. | |
| 8,177,301 B2* | 5/2012 | Saito et al. | 297/411.32 |
| 8,777,317 B2* | 7/2014 | Saito et al. | 297/411.32 |

FOREIGN PATENT DOCUMENTS

EP 0996555 B1 2/2004

* cited by examiner

*Primary Examiner* — Chi Q Nguyen
(74) *Attorney, Agent, or Firm* — MacMillan, Sobanski & Todd, LLC

(57) ABSTRACT

A seat assembly includes a seat including a back and an armrest assembly. The armrest assembly includes a fastener supported on the back of the seat and that defines an axis. A fixed spacer is disposed about the fastener, and a spring bushing is disposed about the fixed spacer. An armrest includes a frame having a rotating bushing supported on the spring bushing. As a result, the frame and the armrest can pivot relative to the fastener and the back of the seat. The spring bushing applies a radial force against both the rotating bushing and the fixed spacer.

19 Claims, 4 Drawing Sheets

STRUCTURE AND METHOD FOR PIVOTABLY SUPPORTING AN ARMREST ON A SEAT

CROSS-REFERENCE TO RELATED APPLICATIONS

This application claims the benefit of U.S. Provisional Application No. 61/453,721, filed Mar. 17, 2011, the disclosure of which is incorporated herein by reference.

BACKGROUND OF THE INVENTION

This invention relates in general to seats, such as are commonly provided in vehicles. In particular, this invention relates to an improved structure and method for pivotably supporting an armrest on a seat.

Seats in vehicles and other environments are commonly provided with one or more armrests to facilitate the comfort of an occupant of the seat. In many instances, the armrest is pivotably supported on a back of a seat so that it may be moved between a retracted position, wherein the armrest extends generally parallel to the back of the seat to facilitate ingress and egress thereto, and an extended position, wherein the armrest extends generally perpendicular to the back of the seat for use by the occupant of the seat. It has been found desirable to support the armrest on the seat in such a manner that a generally uniform and constant force can be used to move the armrest between the retracted and extended positions. Additionally, it has been found desirable to support the armrest on the seat in such a manner that it is capable of handling any laterally directed forces that may be applied thereto, such as by a person who is using the armrest as a handle to get into or out of the seat.

Typically, one or more Belleville or wave washers have been used to apply an axial load on the armrest, which functions to maintain the armrest in a desired position until affirmatively moved by the occupant of the seat to another position. Although these structures have functioned effectively, an undesirably large amount of variation in the amount of the axial load applied thereby can occur as a result of tolerance stack-up. Also, when a laterally directed force is applied to the armrest, the armrest may undesirably move in the lateral direction. Thus, it would be desirable to provide an improved structure for an armrest that avoids these issues.

SUMMARY OF THE INVENTION

A seat assembly includes a seat including a back and an armrest assembly. The armrest assembly includes a fastener supported on the back of the seat and that defines an axis. A fixed spacer is disposed about the fastener, and a spring bushing is disposed about the fixed spacer. An armrest includes a frame having a rotating bushing supported on the spring bushing. As a result, the frame and the armrest can pivot relative to the fastener and the back of the seat. The spring bushing applies a radial force against both the rotating bushing and the fixed spacer.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
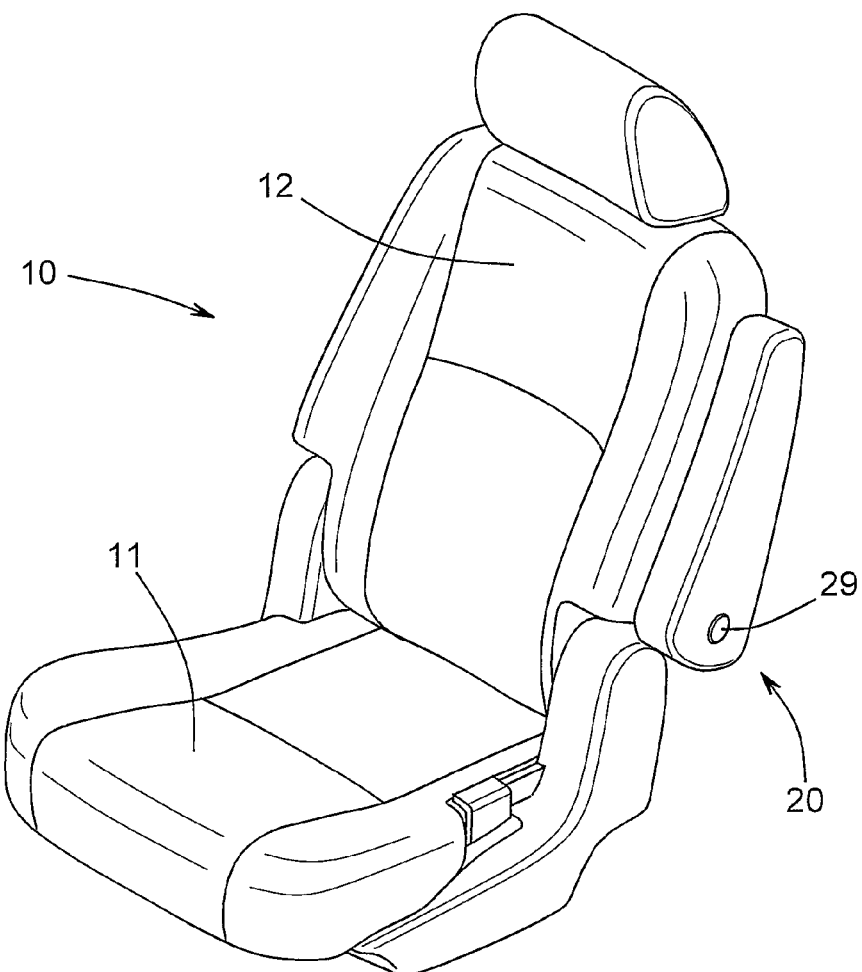
FIG. 1 is a perspective view of a seat including a pivotable armrest in accordance with this invention.

Referring now to the drawings, there is illustrated in FIG. 1 a seat, indicated generally at 10, in accordance with this invention. The illustrated seat 10 is, in large measure, conventional in the art and is intended merely to illustrate one environment in which this invention may be used. Thus, the scope of this invention is not intended to be limited for use with the specific structure for the seat illustrated in FIG. 1 or with seats in general. On the contrary, as will become apparent below, this invention may be used in any desired environment for the purposes described below.

The illustrated seat 10 includes a seat bottom 11 and a seat back 12. The seat back 12 may be supported for pivoting or other movement relative to the seat bottom 11 such that the seat back 12 can be positioned relative to the seat bottom 11 as desired. The seat bottom 11 can be supported on a support surface, such as a floor or frame of a vehicle, by any suitable means.

An armrest assembly, indicated generally at 20, is supported on a portion of the seat 10 for pivoting movement relative thereto. Although the illustrated seat 10 includes only one armrest assembly 20 that is supported on a side portion thereof, it will be appreciated that any desired number of such armrest assemblies 20 may be supported at any desired locations on the seat 10. Alternatively, the armrest assembly 20 may be supported on a structure other than the seat 10, such as on a support surface (not shown) provided within a vehicle. The armrest assembly 20 may be moved between various positions relative to the seat 10, such as between a retracted position (illustrated in FIG. 1), where the armrest assembly 20 is generally parallel to the seat back 12 to facilitate ingress and egress to the seat 10, and an extended position, wherein the armrest assembly 20 is generally perpendicular to the seat back 12 for use by an occupant of the seat 10.

Figure 2:
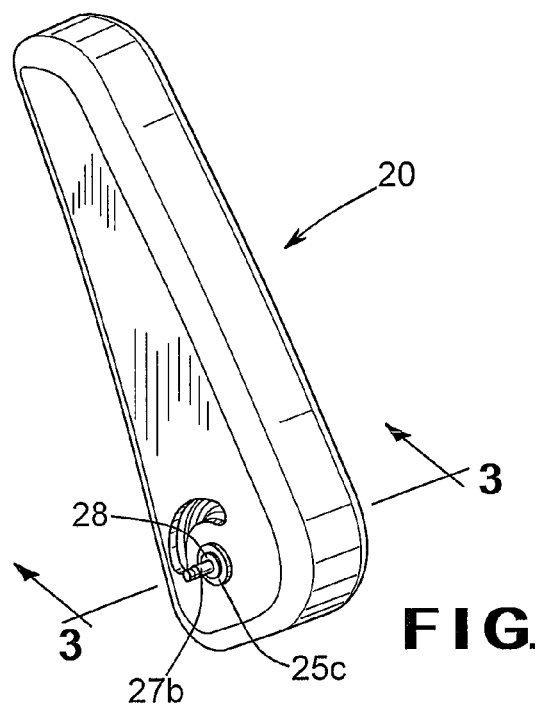
FIG. 2 is an enlarged perspective view of the armrest illustrated in FIG. 1.
Figure 3:
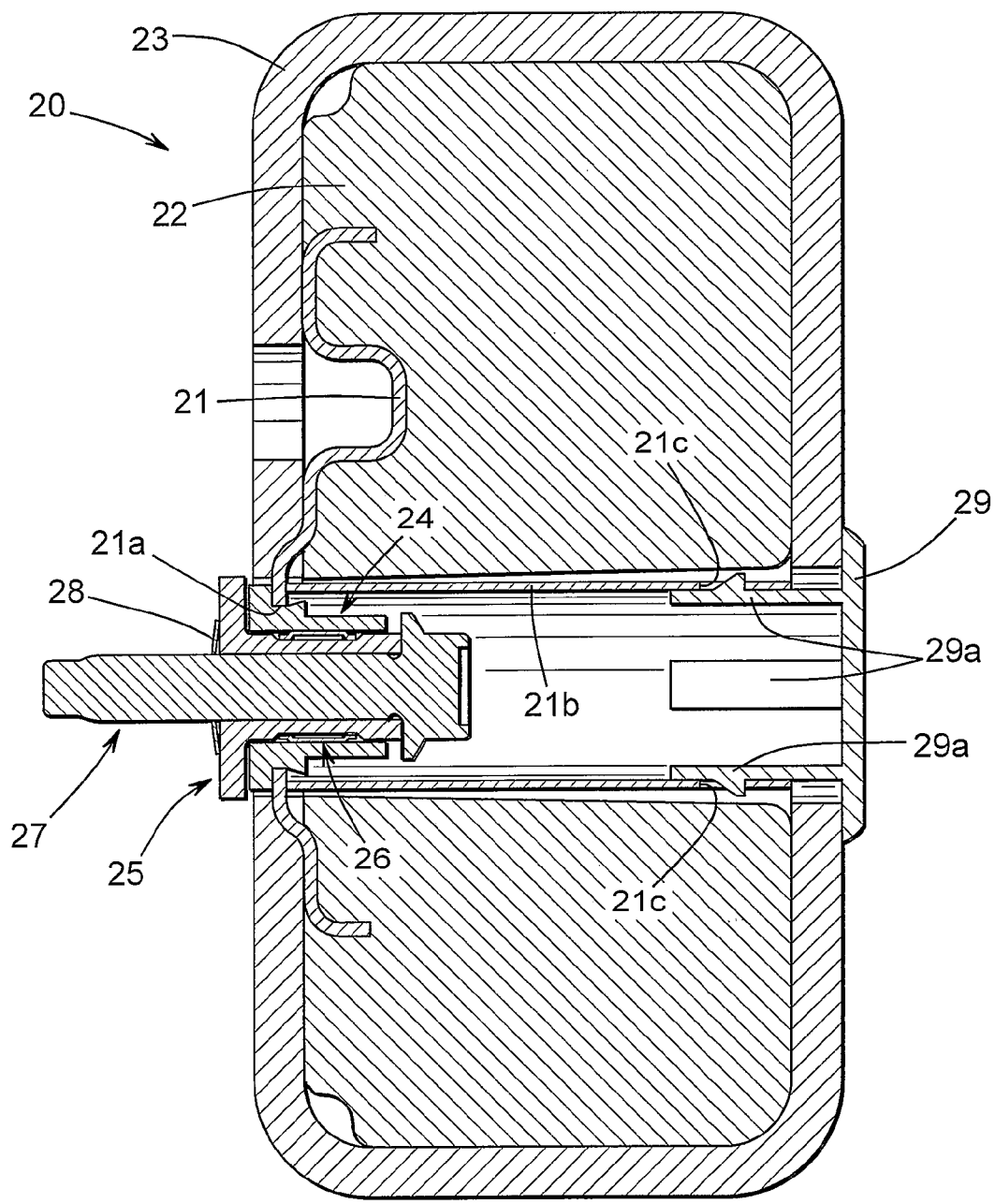
FIG. 3 is a further enlarged sectional elevational view taken along line 3-3 of FIG. 2.
Figure 4:
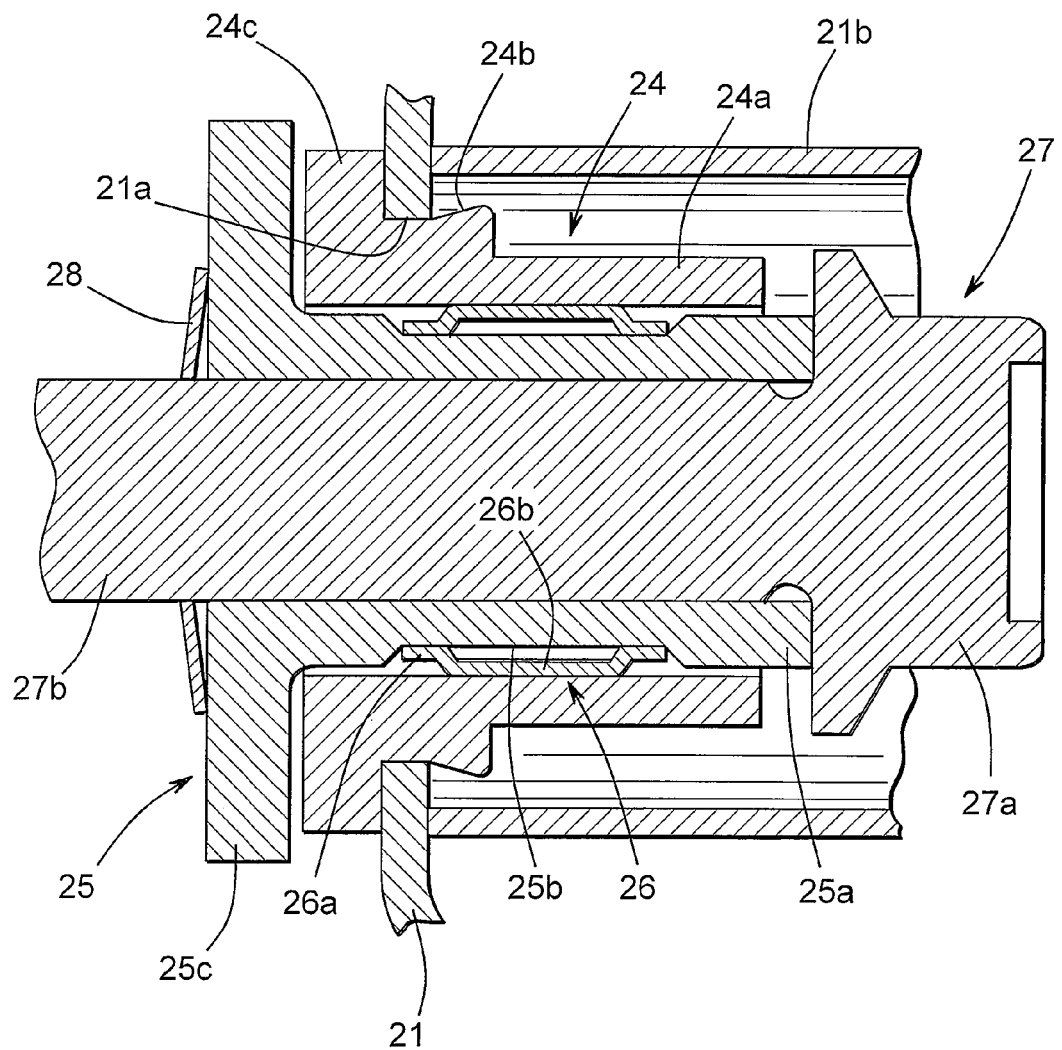
FIG. 4 is a further enlarged sectional elevational view of a portion of the armrest illustrated in FIG. 3.

The structure of the armrest assembly 20 is illustrated in FIGS. 2, 3, and 4. As shown therein, the armrest assembly 20 includes a frame 21 having a cushion 22 supported thereon. The frame 21 can be formed from any desired material, but preferably is formed from a relatively strong and rigid material, such as a metallic material. The cushion 22 can also be formed from any desired material, but preferably is formed from a firm but relatively soft material, such as a foam material. The frame 21 and the cushion 22 may have any desired shape or combination of shapes. As shown in FIGS. 2 and 3, the frame 21 has an opening 21a provided therein for a purpose that will be explained below. Also, a support member 21b having one or more apertures 21c is secured to the frame 21 for a purpose that will also be explained below. If desired, a layer of an outer trim material 23 may be provided about the frame 21 and the cushion 22 for protective and aesthetic purposes.

The armrest assembly 20 also includes a rotating bushing, such as indicated generally at 24. The structure of the rotating bushing 24 is illustrated in detail in FIG. 5. As shown therein, the rotating bushing 24 includes a body portion 24a that, in the illustrated embodiment, is generally hollow and cylindrical in shape. A retaining portion 24b extends from the body portion 24a of the rotating bushing 24, and a flange portion 24c extends from the retaining portion 24b. The flange portion 24c of the rotating bushing 24 has a plurality of protrusions 24d provided thereon. In the illustrated embodiment, the protrusions 24d are generally ramp-shaped and are equidistantly spaced about the circumference of the flange portion 24c. However, the protrusions 24d may have any desired shape (or combination of shapes) and may be provided at any desired locations on the flange portion 24c.

Figure 5:
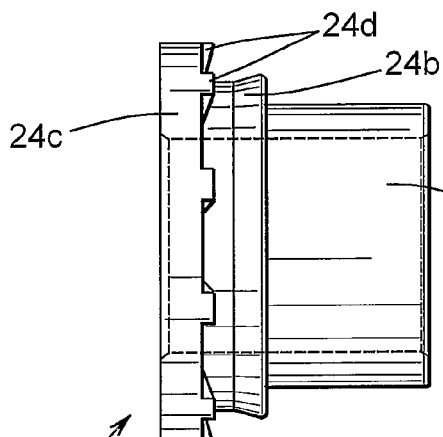
FIG. 5 is a side elevational view of a rotating bushing for the armrest assembly illustrated in FIGS. 3 and 4.

The rotating bushing 24 is secured to the frame 21 of the armrest assembly 20 for movement therewith in any desired manner, such as by welding, staking, clinching, etc. For example, this can be accomplished by initially providing the retaining portion 24b of the rotating bushing 24 with a generally cylindrical shape (not shown). Then, the retaining portion 24b of the rotating bushing 24 is inserted through the opening 21a formed through the frame 21, as shown in FIGS. 2 and 3. Such insertion continues until the engagement protrusions 24d provided on the flange portion 24c of the rotating bushing 24 mechanically engage a portion of a first surface of the frame 21 (the left surface when viewing FIG. 3) about the opening 21a. Then, the retaining portion 24b of the rotating bushing 24 is deformed into engagement with a second surface of the frame 21 (the right surface when viewing FIG. 3). The deformed region of the retaining portion 24b can have a generally ramp-shaped cross section, as shown in FIGS. 3, 4, and 5. As a result, the rotating bushing 24 is secured to the frame 21 of the armrest assembly 20 for movement therewith. Alternatively, the rotating bushing 24 may be secured to the frame 21 of the armrest assembly 20 for movement therewith in any other desired manner.

Figure 6:
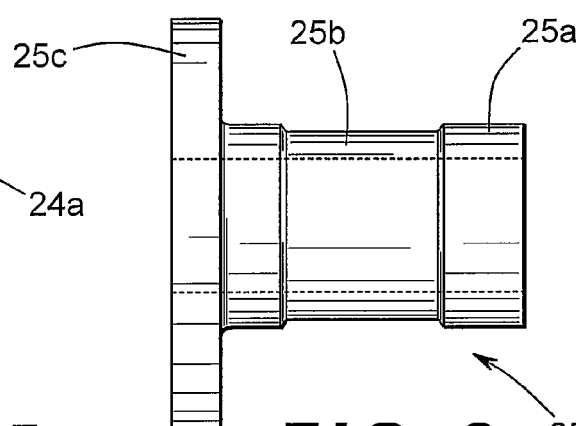
FIG. 6 is a side elevational view of a fixed spacer for the armrest assembly illustrated in FIGS. 3 and 4.

The armrest assembly 20 further includes a fixed spacer, indicated generally at 25, upon which the rotating bushing 24 and the frame 21 of the armrest assembly 20 are supported for relative rotational movement. The structure of the fixed spacer 25 is illustrated in detail in FIG. 6. As shown therein, the fixed spacer 25 includes a body portion 25a that, in the illustrated embodiment, is generally hollow and cylindrical in shape. An annular groove 25b may be formed in a portion of the outer surface of the body portion 25a of the fixed spacer 25 for a purpose that will be explained below. A flange portion 25c extends from the body portion 25a. As best shown in FIGS. 3 and 4, the body portion 25a of the fixed spacer 25 is disposed within the hollow body portion 24a of the rotating bushing 24. In this manner, the rotating bushing 24 and the frame 21 of the armrest assembly 20 are supported for rotation relative to the fixed spacer 25.

Figure 7:
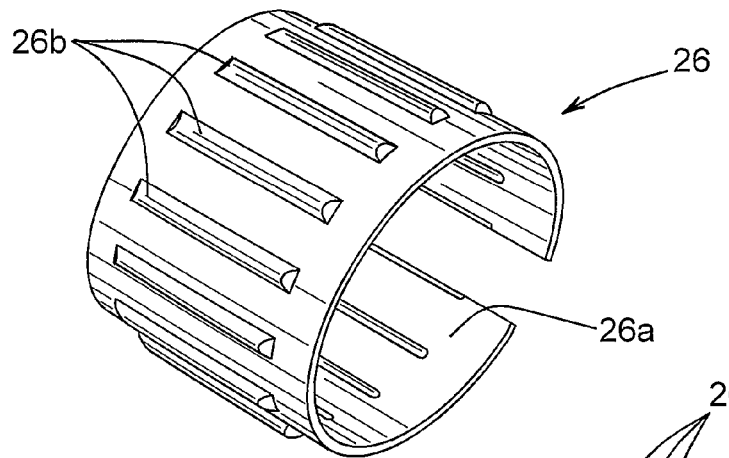
FIG. 7 is an enlarged perspective view of a spring bushing for the armrest assembly illustrated in FIGS. 3 and 4, wherein the spring bushing is shown in an expanded condition.
Figure 8:
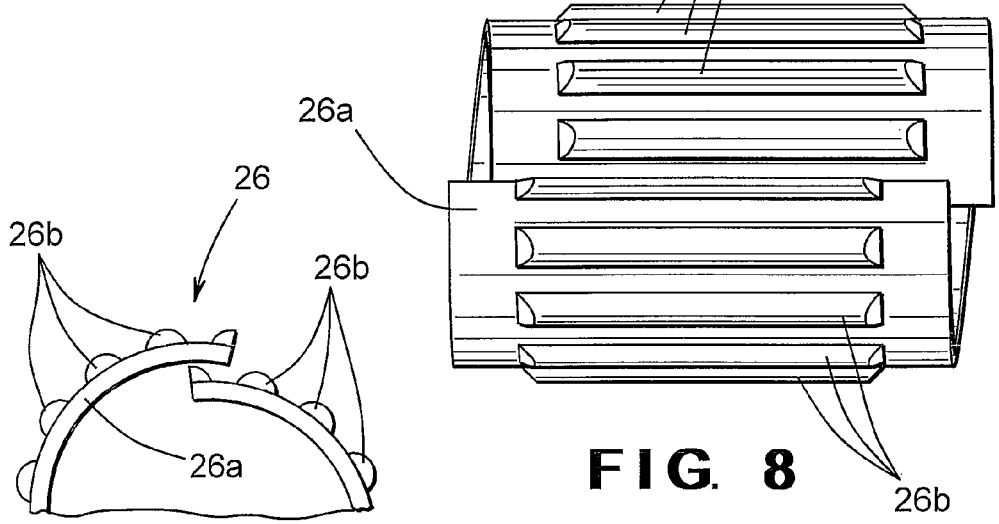
FIG. 8 is a side elevational view of the spring bushing illustrated in FIG. 7, wherein the spring bushing is shown in a relaxed condition.
Figure 9:
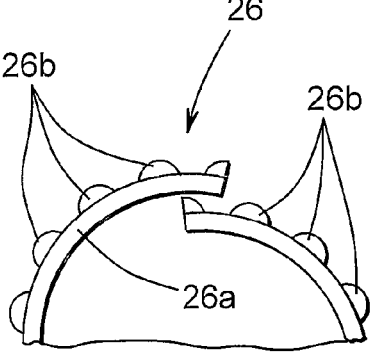
FIG. 9 is an end elevational view of a portion of the spring bushing illustrated in FIGS. 7 and 8, wherein the spring bushing is shown in a relaxed condition.

A spring bushing, indicated generally at 26, is disposed between the rotating bushing 24 and the fixed spacer 25. The structure of the spring bushing 26 is illustrated in an expanded condition in FIG. 7 and in a relaxed condition in FIGS. 8 and 9. As shown therein, the spring bushing 26 includes a body portion 26a that, in the illustrated embodiment, is generally hollow and cylindrical in shape. However, the body portion 26a of the spring bushing 26 is split in the longitudinal direction so as to have a generally C-shaped cross sectional configuration. The spring bushing 26 may be formed from any desired material, but preferably is formed from a sheet of resilient metallic material. A plurality of radially outwardly extending ridges 26b are provided on the outer circumferential surface of the spring bushing 26. In the illustrated embodiment, the ridges 26b are formed as embossments in the spring bushing 26, although such is not required. The purpose of the ridges 26b will be explained below.

As mentioned above, the spring bushing 26 is disposed between the rotating bushing 24 and the fixed spacer 25. In the illustrated embodiment, the spring bushing 26 is disposed within the groove 25b formed in the outer surface of the body portion 25a of the fixed spacer 25. As a result, the spring bushing 26 is positively retained in the axial direction between the rotating bushing 24 and the body portion 25a of the fixed spacer 25. Prior to installation, the spring bushing 26 is normally maintained in the relaxed condition illustrated in FIGS. 8 and 9. However, when disposed about the fixed spacer 25, the spring bushing 26 is enlarged into the expanded condition illustrated in FIGS. 3, 4, and 7. When the fixed spacer 25 is inserted within the rotating bushing 24, the body portion 26a of the spring bushing 26 bears against the outer surface of the body portion 25a of the fixed spacer 25, while the ridges 26b of the spring bushing 26 bear against an inner surface of the body portion 24a of the rotating bushing 24. As a result, the rotating bushing 24 can rotate relative to the fixed spacer 25. However, any looseness therebetween is effectively prevented by the spring bushing 26.

Lastly, a fastener, indicated generally at 27, is provided for securing the armrest assembly 20 to the seat 10. In the illustrated embodiment, the fastener 27 is a conventional bolt having a head portion 27a and a shank portion 27b. The illustrated head portion 27a is provided with a driving structure for facilitating the rotation thereof by a conventional tool (not shown), such as a screwdriver, hex head driver, or the like. The illustrated shank portion 27b is provided with an externally threaded surface that can cooperate with a corresponding internally threaded surface (not shown) provided on a frame or other portion of the seat 10 to secure the armrest assembly 20 to the seat 10. As shown in FIGS. 3 and 4, the fastener 27 is installed on the armrest assembly 20 by inserting the shank portion 27b through the hollow body portion 25a of the fixed spacer 25 until the head portion 27a of the fastener 27 abuts the end of such body portion 25a. When so installed, the end of the shank portion 27b extends outwardly from the armrest assembly 20, as shown in FIGS. 2, 3, and 4.

To retain the fastener 27 on the armrest assembly 20 prior to installation on the seat 10, a push nut 28 is provided on the end of the shank portion 27b that extends outwardly from the armrest assembly 20. The push nut 28 is an optional assembly aid that is conventional in the art and is adapted to frictionally or mechanically engage the outer surface of the shank portion 27b. When installed on the end of the shank portion 27b of the fastener 27, the push nut 28 also engages the flange portion 25c of the fixed spacer 25. As a result, the fastener 27 is positively retained on the armrest assembly 20 prior to installation on the seat 10. As best shown in FIGS. 2 and 3, the push nut 28 allows the end of the shank portion 27b of the fastener 27 to extend outwardly from the armrest assembly 20 for easy alignment with the internally threaded surface provided on the seat 10. As mentioned above, a tool (not shown) can be inserted through the support member 21b into engagement with the head portion 27a to rotate the fastener 27 and thereby secure the armrest assembly 20 to the seat 10. Thereafter, the tool can be removed, and a trim cover 29 can be installed to close the end of the support member 21b and provide an aesthetically pleasing appearance to the armrest assembly 20 and the seat 10. The trim cover 29 can include one or more retaining legs 29a that cooperate with the apertures 21c formed through the support member 21b to facilitate the securement of the trim cover 29 to the support member 21b.

When the armrest assembly 20 has been secured to the seat 10 as described above, the fixed spacer 25 is clamped between the head portion 27a of the fastener 27 and the seat 10. Thus, the fixed spacer 25 is effectively fixed in position relative to the seat 10. A radial force is applied by the spring bushing 26 against the rotating bushing 24. Accordingly, when the armrest assembly 20 is moved between the extended and retracted positions as described above, relative pivoting or rotational movement occurs between the rotating bushing 24 and the fixed spacer 25 about an axis defined by the fixed spacer 25 and the fastener 27. To facilitate such relative pivoting or rotational movement, a quantity of a lubricating material (not shown) may be provided therebetween and in the groove 25b.

If desired, an adhesive material (not shown) may be provided on the shank portion 27b of the fastener 27 before it is secured to the seat. Any conventional adhesive material may be used for this purpose. For example, a microencapsulated adhesive material may be provided that releases a catalyst to cure the adhesive material as the shank portion 27b is threaded into the seat 10. The adhesive material can be configured in such a manner that it remains bonded to the seat during normal pivoting movement of the armrest assembly 20, but may be broken with sufficient torque of the fastener 27, such as during repair or replacement.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest assembly that is adapted to be supported on a seat comprising:
   a fastener that is adapted to be supported on a seat and that defines an axis;
   a fixed spacer disposed about the fastener and having a groove provided in an outer surface thereof;
   a spring bushing disposed within the groove of the fastener such that the spring bushing applies a radial force against both the rotating bushing and the fixed spacer; and
   an armrest including a frame having a rotating bushing supported on the spring bushing such that the frame and the armrest can pivot relative to the fastener.

2. The armrest assembly defined in claim 1 wherein the fastener includes a head portion and a shank portion, and wherein the spring bushing is disposed about the shank portion of the fastener.

3. The armrest assembly defined in claim 1 wherein the fixed spacer includes a body portion and a flange portion, and wherein the spring bushing is disposed about the body portion of the fixed spacer.

4. The armrest assembly defined in claim 1 further including a push nut supported on the fastener to retain the fixed spacer thereon.

5. The armrest assembly defined in claim 1 wherein the spring bushing includes a body portion that is generally hollow and cylindrical in shape.

6. The armrest assembly defined in claim 1 wherein the spring bushing is split so as to have a generally C-shaped cross sectional configuration.

7. The armrest assembly defined in claim 1 wherein the spring bushing has a plurality of radially outwardly extending ridges provided thereon.

8. The armrest assembly defined in claim 7 wherein each of the plurality of radially outwardly extending ridges is formed as an embossment in the spring bushing.

9. A seat assembly comprising:
   a seat including a back; and
   the armrest assembly defined in claim 1, wherein the fastener is supported on the back of the seat.

10. An armrest assembly that is adapted to be supported on a seat comprising:
    a fastener that is adapted to be supported on a seat and that defines an axis;
    a split spring bushing having a generally C-shaped cross sectional configuration disposed about the fastener; and
    an armrest including a frame having a rotating bushing supported on the spring bushing such that the frame and the armrest can pivot relative to the fastener, wherein the spring bushing applies a radial force against both the rotating bushing and the fastener.

11. The armrest assembly defined in claim 10 wherein the fastener includes a head portion and a shank portion, and wherein the spring bushing is disposed about the shank portion of the fastener.

12. The armrest assembly defined in claim 10 wherein a fixed spacer is provided between the fastener and the spring bushing, wherein the spring bushing applies a radial force against both the rotating bushing and the fixed spacer.

13. The armrest assembly defined in claim 12 wherein the fixed spacer includes a body portion and a flange portion, and wherein the spring bushing is disposed about the body portion of the fixed spacer.

14. The armrest assembly defined in claim 12 wherein the fixed spacer has a groove provided in an outer surface thereof, and wherein the spring bushing is disposed within the groove.

15. The armrest assembly defined in claim 10 further including a push nut supported on the fastener to retain the fixed spacer thereon.

16. The armrest assembly defined in claim 10 wherein the spring bushing includes a body portion that is generally hollow and cylindrical in shape.

17. The armrest assembly defined in claim 10 wherein the spring bushing has a plurality of radially outwardly extending ridges provided thereon.

18. The armrest assembly defined in claim 17 wherein each of the plurality of radially outwardly extending ridges is formed as an embossment in the spring bushing.

19. An armrest assembly that is adapted to be supported on a seat comprising:
    a fastener that is adapted to be supported on a seat and that defines an axis;
    an armrest including a frame having a rotating bushing; and
    a spring bushing disposed between the rotating bushing and the fastener such that the frame and the armrest can pivot relative to the fastener, wherein the spring bushing engages portions of the armrest assembly and applies radial forces simultaneously both outwardly against the rotating bushing and inwardly against the fastener.

* * * * *